(12) United States Patent
Boelderl-Ermel et al.

(10) Patent No.: US 12,056,152 B2
(45) Date of Patent: Aug. 6, 2024

(54) OPERATIONAL POLICIES OF INDUSTRIAL FIELD DEVICES AND DISTRIBUTED DATABASES

(71) Applicant: Siemens Aktiengesellschaft, Munich (DE)

(72) Inventors: Wolfgang Boelderl-Ermel, Wendelstein (DE); Stefan Boemoser, Ansbach (DE); Rene Ermler, Erlangen (DE); Alexander Kepka, Nuremberg (DE); Wolfgang Riedl, Nuremberg (DE); Joachim Seidl, Sulzbach-Rosenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 156 days.

(21) Appl. No.: 15/930,705

(22) Filed: May 13, 2020

(65) Prior Publication Data

US 2020/0371487 A1    Nov. 26, 2020

(30) Foreign Application Priority Data

May 22, 2019   (EP) .................................... 19175899

(51) Int. Cl.
*G05B 19/00*    (2006.01)
*G05B 19/042*   (2006.01)
(Continued)

(52) U.S. Cl.
CPC ......... *G06F 16/27* (2019.01); *G05B 19/0426* (2013.01); *G06F 16/2365* (2019.01);
(Continued)

(58) Field of Classification Search
CPC ... H04L 9/3239; H04L 9/3247; H04L 9/7011; H04L 67/12; H04L 63/123; H04L 9/3263;
(Continued)

(56) References Cited

U.S. PATENT DOCUMENTS 5,280,586 A * 1/1994 Kunz .................... G06F 13/385
                                                      710/2
6,094,600 A * 7/2000 Sharpe, Jr. ......... G05B 19/4185
                                                      700/83
(Continued)

FOREIGN PATENT DOCUMENTS

CN        101159049 A      4/2008
CN        103970900 A      8/2014
(Continued)

OTHER PUBLICATIONS

Chen et al, CN 104794771, (translation), Jul. 22, 2015, 10 pgs <CN_104794771.pdf>.*
(Continued)

*Primary Examiner* — Tuan A Vu
(74) *Attorney, Agent, or Firm* — Harness, Dickey & Pierce, P.L.C.

(57) ABSTRACT

A configuration dataset indicative of a setting of one or more operational policies of a control of an industrial field device and a measurement dataset indicative of an event associated with the industrial field device is read from a distributed database. An analysis of the measurement dataset is performed, depending on the configuration dataset.

8 Claims, 6 Drawing Sheets

(51) Int. Cl.
  *G06F 16/23* (2019.01)
  *G06F 16/27* (2019.01)
  *H04L 9/32* (2006.01)
  *G03F 9/00* (2006.01)
  *G05B 19/418* (2006.01)
  *G06F 13/38* (2006.01)
  *G06F 15/16* (2006.01)
  *G06F 16/25* (2019.01)

(52) U.S. Cl.
  CPC .......... *H04L 9/3247* (2013.01); *G03F 9/7011* (2013.01); *G05B 19/4183* (2013.01); *G05B 19/41845* (2013.01); *G05B 2219/25428* (2013.01); *G06F 13/385* (2013.01); *G06F 15/16* (2013.01); *G06F 16/256* (2019.01); *H04L 9/3239* (2013.01)

(58) Field of Classification Search
  CPC ...... G06F 16/256; G06F 13/385; G06F 15/16; G06F 16/27; G06F 16/2365; G06F 21/6281; G06F 7/24; G05B 19/41845; G05B 19/4183; G05B 19/4185; G05B 19/0426; G05B 2219/25428; H02J 3/144; G01G 19/44
  See application file for complete search history.

(56) References Cited

U.S. PATENT DOCUMENTS

| | | | |
|---|---|---|---|
| 10,193,695 | B1 | 1/2019 | Endress et al. |
| 2002/0111948 | A1* | 8/2002 | Nixon .................. G06F 15/16 |
| 2003/0223630 | A1* | 12/2003 | Adel .................. G03F 9/7011 382/145 |
| 2006/0206866 | A1* | 9/2006 | Eldrige ............ G05B 19/41845 717/122 |
| 2011/0126142 | A1* | 5/2011 | Zhou .................. G05B 19/4183 715/771 |
| 2015/0163247 | A1* | 6/2015 | Kapoor ............... G06F 21/6281 726/1 |
| 2016/0055191 | A1 | 2/2016 | Joshi et al. |
| 2016/0261482 | A1 | 9/2016 | Mixer et al. |
| 2017/0103103 | A1* | 4/2017 | Nixon .................. G06F 16/256 |
| 2017/0289111 | A1* | 10/2017 | Voell .................. H04L 9/3239 |
| 2018/0285479 | A1 | 10/2018 | Mackay et al. |
| 2018/0375665 | A1* | 12/2018 | Contenti ................ G01G 19/44 |
| 2019/0102782 | A1* | 4/2019 | Diehl .................. H04L 9/3263 |
| 2019/0386833 | A1* | 12/2019 | Alger .................. G06F 7/24 |
| 2020/0143267 | A1* | 5/2020 | Gidney ................. H04L 63/123 |
| 2020/0259633 | A1* | 8/2020 | Gallagher-Lynch .... H04L 67/12 |
| 2020/0326679 | A1* | 10/2020 | Maher ................. H02J 3/144 |

FOREIGN PATENT DOCUMENTS

| | | |
|---|---|---|
| CN | 105939334 A | 9/2016 |
| CN | 108303144 A | 7/2018 |
| CN | 109558301 A | 4/2019 |
| CN | 109582547 A | 4/2019 |
| CN | 109728649 A | 5/2019 |
| WO | WO-2019064658 A1 | 4/2019 |

OTHER PUBLICATIONS

Ide Tsuyoshi: "Collaborative Anomaly Detection on Blockchain from Noisy Sensor Data", 2018 IEEE International Conference on Data Mining Workshops (ICDMW), IEEE, pp. 120-127, XP033516185, DOI: 10.1109/ICDMW.2018.00024; [retrieved on Feb. 7, 2019]; Section III; 2018.
Andreas M. Antonopoulos "Mastering Bitcoin: Unlocking Digital Cryptocurrencies", O'Reilly Media, Dec. 2014.
Roger M. Needham, Michael D. Schroeder "Using encryption for authentication in large networks of computers" ACM: Communications of the ACM. vol. 21, Nr. Dec. 12, 1978.
Ross Anderson "Security Engineering. A Guide to Building Dependable Distributed Systems" Wiley, 2001.
Henning Diedrich, "Ethereum: Blockchains, Digital Assets, Smart Contracts, Decentralized Autonomous Organizations", CreateSpace Independent Publishing Platform, 2016.
"The Ethereum Book Project/Mastering Ethereum" https://github.com/ethereumbook/ethereumbook, Oct. 10, 2017.
Leemon Baird "The Swirlds Hashgraph Consensus Algorithm: Fair, Fast, Byzantine Fault Tolerance", Swirlds Tech Report SWIRLDS-TR-2016-01, May 31, 2016.
Leemon Baird "Overview of Swirlds Hashgraph", May 31, 2016.
Blockchain Oracles, <https://blockchainhub.net/blockchain-oracles/.

* cited by examiner

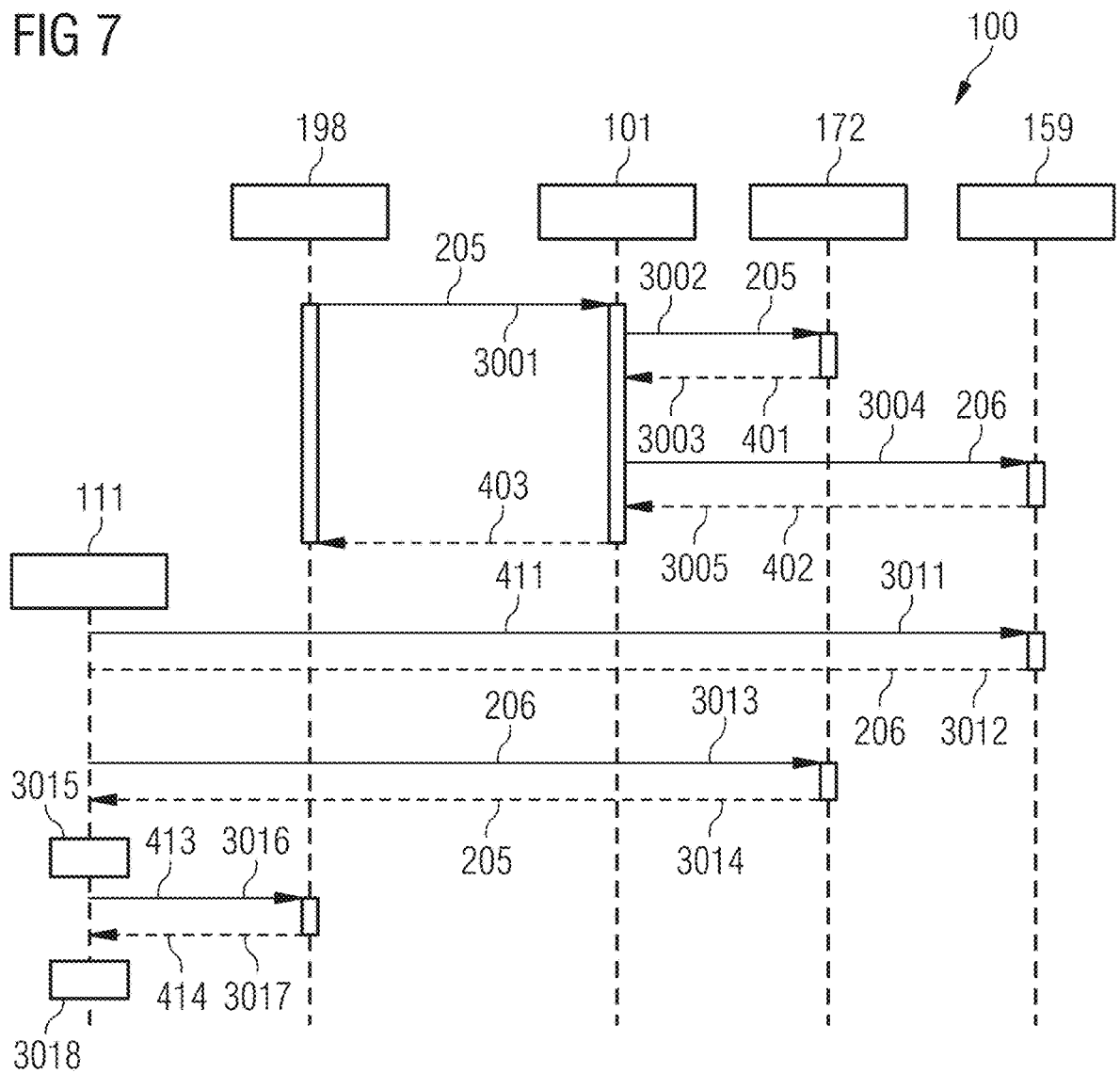

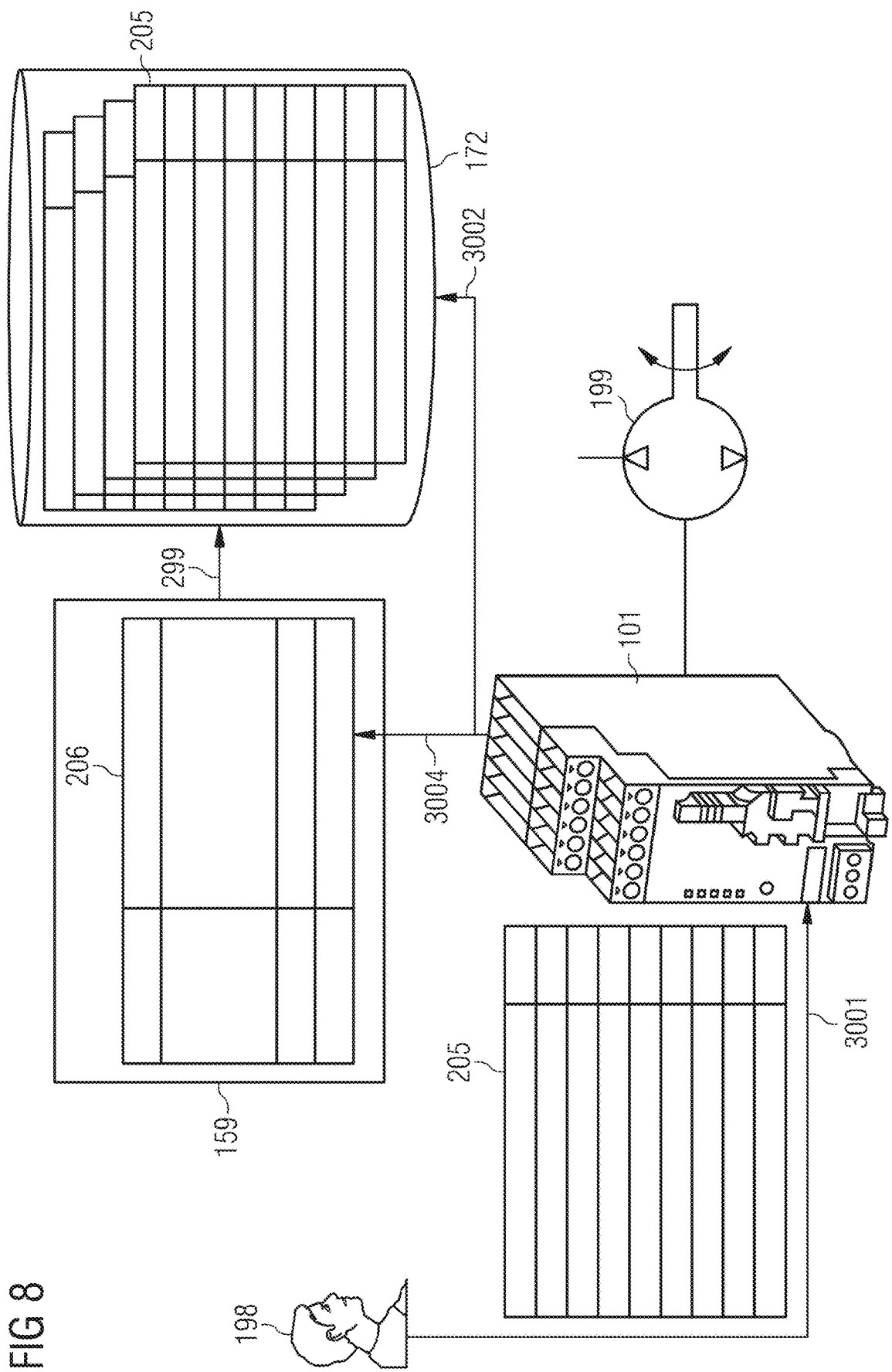

OPERATIONAL POLICIES OF INDUSTRIAL FIELD DEVICES AND DISTRIBUTED DATABASES

PRIORITY STATEMENT

The present application hereby claims priority under 35 U.S.C. § 119 to European patent application number EP 19175899.4 filed May 22, 2019, the entire contents of which are hereby incorporated herein by reference.

FIELD

At least one embodiment of the invention generally relates to monitoring operation of industrial field devices. Various examples of embodiments of the invention specifically relate to storing a configuration dataset which is indicative of a setting of one or more operational policies of a control of an industrial field device in a distributed database.

BACKGROUND

Monitoring of the operation of industrial field devices is relevant in various use cases.

In one example, predictive maintenance helps to proactively identify a need for one or more maintenance actions associated with the industrial field device. Here, typically, a measurement dataset of the industrial field device is obtained and analyzed. The measurement dataset can be indicative of an event associated with the industrial field device. For example, the event can pertain to abnormal operation. Then, based on the measurement dataset, predictive maintenance may be triggered.

A further use case of monitoring the operation of industrial field devices involves intrusion detection. Here, unauthorized access to the control—generally implemented in hardware and/or software—of the industrial field device can be detected. Again, a measurement dataset can be analyzed in order to detect abnormalities in the operation.

Yet a further use case is related to on-demand function activation or performance-based charging. Here, instead of making a onetime payment when purchasing an industrial field device, a customer can choose to activate or deactivate certain functions of the operation of the industrial field device on demand. Often, the fulfillment of the associated agreement between the operator and the manufacturer can be monitored based on a measurement dataset. Here, it can be checked whether the events indicated by the measurement dataset associated with the industrial field device are in conformity with the activated/deactivated functions of the operation of the industrial field device.

In all such scenarios as illustrated above it can be desirable to provide the measurement dataset with significant trust. In particular, a manipulation of the measurement dataset is typically to be avoided. Otherwise, the interest of one or more of the stakeholders in the process would be compromised.

SUMMARY

The inventors have discovered that to increase the security against manipulation of the measurement dataset by storing the measurement dataset in a distributed database. The inventors recognize that distributed databases—such as the blockchain or other distributed ledgers—offer increased security against manipulation of data. More generally speaking, various functionality—e.g., sense and control functionality in industrial environments, control of electrical grids, transport systems, etc.—sometimes relies on data stored in the distributed database. The data of a distributed database is generally distributed and replicated across multiple nodes of a corresponding distributed database infrastructure.

The inventors have discovered that a need exists for advanced techniques of storing a measurement dataset in a distributed database.

A node, in at least one embodiment, includes a control circuitry. The control circuitry is configured to obtain a configuration dataset. The configuration dataset is indicative of a setting of one or more operational policies of a control of an industrial field device. The control circuitry is also configured to obtain a measurement dataset. The measurement dataset is indicative of an event associated with the industrial field device. Further, the control circuitry is configured to write the configuration dataset in the measurement dataset to a distributed database. The control circuitry is further configured to write a cross-reference between the configuration dataset and the measurement dataset to the distributed database.

A method, in at least one embodiment, includes obtaining a configuration dataset. The configuration dataset is indicative of a setting of one or more operational policies of a control of an industrial field device. The method also includes obtaining a measurement dataset. The measurement dataset is indicative of an event associated with the industrial field device. The method also includes writing the configuration dataset and the measurement dataset to a distributed database and writing a cross-reference between the configuration dataset and the measurement dataset to the distributed database.

A computer program or a computer-program product or a computer-readable storage medium, in at least one embodiment, includes program code. The program code can be loaded and executed by a processor. Executing the program code causes the processor to perform a method. A method, in at least one embodiment, includes obtaining a configuration dataset that is indicative of a setting of one or more operational policies of a control of an industrial field device; and obtaining a measurement dataset indicative of an event associated with the industrial field device; and writing the configuration dataset and the measurement dataset to a distributed database; and writing a cross-reference between the configuration dataset and the measurement dataset to the distributed database.

A node, in at least one embodiment, includes a control circuitry. The control circuitry is configured to read a cross-reference from a distributed database. The cross-reference is between a configuration dataset and a measurement dataset. The configuration dataset is indicative of a setting of one or more operational policies of a control of an industrial field device. The measurement dataset is indicative of an event associated with the industrial field device. The control circuitry is further configured to read the configuration dataset from the distributed database and to read the measurement dataset from the distributed database. Further, the control circuitry is configured to perform an analysis of the measurement dataset, depending on the configuration dataset.

A method, in at least one embodiment, includes reading a cross-reference from a distributed database. The cross-reference is between a configuration dataset and a measurement dataset. The configuration dataset is indicative of a setting of one or more operational policies of a control of an industrial field device. The measurement dataset is indicative of an event associated with the industrial field device. The method also includes reading the configuration dataset and the measurement dataset from the distributed database. Further, the method includes performing an analysis of the measurement dataset depending on the configuration dataset.

A computer program or a computer-program product or a computer-readable storage medium, in at least one embodiment, includes program code. The program code can be loaded and executed by at least one processor. Loading and executing the program code causes the processor to perform a method. The method includes reading, from a distributed database, a cross-reference between a configuration dataset and a measurement dataset. The configuration dataset is indicative of a setting of one or more operational policies of a control of an industrial field device; and the measurement dataset is indicative of an event associated with the industrial field device. The method also includes reading the configuration dataset and the measurement dataset from the distributed database, and performing an analysis of the measurement dataset depending on the configuration dataset.

At least one embodiment is directed to a node, comprising:
 a control circuitry configured to:
 obtain a configuration dataset indicative of a setting of one or more operational policies of a control of an industrial field device,
 obtain a measurement dataset indicative of an event associated with the industrial field device,
 write the configuration dataset obtained and the measurement dataset obtained to a distributed database, and
 write a cross-reference between the configuration dataset obtained and the measurement dataset obtained to the distributed database.

At least one embodiment is directed to a node, comprising:
 control circuitry configured to:
 read, from a distributed database,
  a configuration dataset indicative of a setting of one or more operational policies of a control of an industrial field device,
  a measurement dataset indicative of an event associated with the industrial field device, and
  a cross-reference between the configuration dataset and the measurement dataset; and
 perform an analysis of the measurement dataset depending on the configuration dataset.

At least one embodiment is directed to a method, comprising:
 obtaining a configuration dataset indicative of a setting of one or more operational policies of a control of an industrial field device;
 obtaining a measurement dataset indicative of an event associated with the industrial field device;
 writing the configuration dataset obtained and the measurement dataset obtained to a distributed database, and
 writing a cross reference between the configuration dataset obtained and the measurement dataset obtained to the distributed database.

At least one embodiment is directed to a method, comprising:
 reading, from a distributed database, a cross reference between a configuration dataset indicative of a setting of one or more operational policies of a control of an industrial field device and a measurement dataset indicative of an event associated with the industrial field device;
 reading the configuration dataset from the distributed database;
 reading the measurement dataset from the distributed database; and
 performing an analysis of the measurement dataset depending on the configuration dataset.

At least one embodiment is directed to a non-transitory computer readable storage medium storing program code, loadable and executable by a processor, which when executed by the processor, configures the processor to execute the method of an embodiment.

BRIEF DESCRIPTION OF THE DRAWINGS

FIG. 7 is a signaling diagram of communication between various nodes of the system according to various examples.

FIG. 8 is a functional flowchart associated with the signaling of FIG. 7.

DETAILED DESCRIPTION OF EXAMPLE EMBODIMENTS

Figure 1:
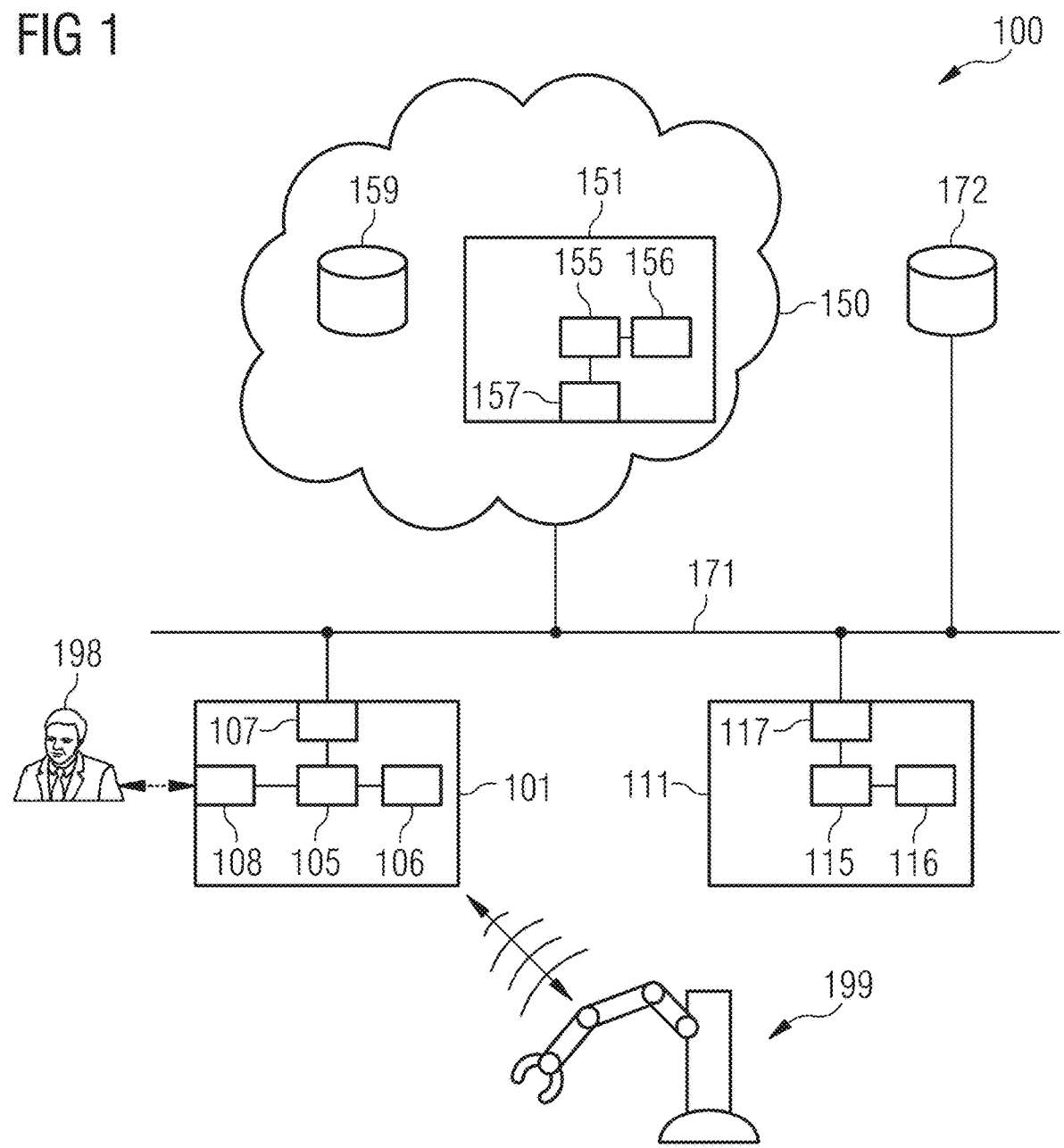
FIG. 1 schematically illustrates a system including a blockchain infrastructure, a control node, and a third-party node according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

A node, in at least one embodiment, includes a control circuitry. The control circuitry is configured to obtain a configuration dataset. The configuration dataset is indicative of a setting of one or more operational policies of a control of an industrial field device. The control circuitry is also configured to obtain a measurement dataset. The measurement dataset is indicative of an event associated with the industrial field device. Further, the control circuitry is configured to write the configuration dataset in the measurement dataset to a distributed database. The control circuitry is further configured to write a cross-reference between the configuration dataset and the measurement dataset to the distributed database.

A method, in at least one embodiment, includes obtaining a configuration dataset. The configuration dataset is indicative of a setting of one or more operational policies of a control of an industrial field device. The method also includes obtaining a measurement dataset. The measurement dataset is indicative of an event associated with the industrial field device. The method also includes writing the configuration dataset and the measurement dataset to a distributed database and writing a cross-reference between the configuration dataset and the measurement dataset to the distributed database.

A computer program or a computer-program product or a computer-readable storage medium, in at least one embodiment, includes program code. The program code can be loaded and executed by a processor. Executing the program code causes the processor to perform a method. A method, in at least one embodiment, includes obtaining a configuration dataset that is indicative of a setting of one or more operational policies of a control of an industrial field device; and obtaining a measurement dataset indicative of an event associated with the industrial field device; and writing the configuration dataset and the measurement dataset to a distributed database; and writing a cross-reference between the configuration dataset and the measurement dataset to the distributed database.

A node, in at least one embodiment, includes a control circuitry. The control circuitry is configured to read a cross-reference from a distributed database. The cross-reference is between a configuration dataset and a measurement dataset. The configuration dataset is indicative of a setting of one or more operational policies of a control of an industrial field device. The measurement dataset is indicative of an event associated with the industrial field device. The control circuitry is further configured to read the configuration dataset from the distributed database and to read the measurement dataset from the distributed database. Further, the control circuitry is configured to perform an analysis of the measurement dataset, depending on the configuration dataset.

A method, in at least one embodiment, includes reading a cross-reference from a distributed database. The cross-reference is between a configuration dataset and a measurement dataset. The configuration dataset is indicative of a setting of one or more operational policies of a control of an industrial field device. The measurement dataset is indicative of an event associated with the industrial field device. The method also includes reading the configuration dataset and the measurement dataset from the distributed database. Further, the method includes performing an analysis of the measurement dataset depending on the configuration dataset.

A computer program or a computer-program product or a computer-readable storage medium, in at least one embodiment, includes program code. The program code can be loaded and executed by at least one processor. Loading and executing the program code causes the processor to perform a method. The method includes reading, from a distributed database, a cross-reference between a configuration dataset and a measurement dataset. The configuration dataset is indicative of a setting of one or more operational policies of a control of an industrial field device; and the measurement dataset is indicative of an event associated with the industrial field device. The method also includes reading the configuration dataset and the measurement dataset from the distributed database, and performing an analysis of the measurement dataset depending on the configuration dataset.

Unless explicitly stated otherwise the terms "perform", "calculate", "computer-implemented", "calculate", "establish", "generate", "configure", "reconstruct" and the like preferably relate to actions and/or processes and/or processing steps which modify data and/or which generate data and/or which transform data in other data. Data can be represented by physical quantities or be present as physical quantities, e.g., as electrical pulses. In particular, the term "computer" should be interpreted broadly to cover all electronic devices having data processing capabilities. Computers can, thus, be implemented by personal computers, servers, memory programmable controllers, handheld computer systems, pocket PC devices, wireless communication devices and other communication devices that can process data, processors and other electronic devices for processing data.

In the context of the present disclosure "computer-implemented" can relate to an implementation of a method in which a processor performs at least one method step.

A processor in the context of the present disclosure can be a machine or electronic circuit. A processor can be specifically implemented by a central processing unit (CPU) or a microprocessor or a microcontroller, e.g., an application-specific integrated circuit (ASIC) or a digital signal processor, possibly in combination with a memory unit for storing program code, etc. A processor can alternatively or additionally be implemented by an integrated circuit (IC), specifically a field programmable gate array (FPGA), an ASIC or a digital signal processor (DSP) or a graphic processing unit (GPU). Alternatively or additionally, a processor can be implemented by a virtual processor or a virtual machine or a soft CPU. A processor can be implemented by a programmable processor having configuration interfaces that facilitate configuration of various techniques described herein. The programmable processor can be configured to implement method steps as described herein, components, modules, or other aspects of the techniques described herein.

A "memory" or "memory unit" or "memory module" or the like can be implemented by a volatile memory in the form of random access memory (RAM) or a non-volatile memory such as a hard disc or data carrier.

The term "include"—specifically with respect to data and/or information—can relate to a (computer-implemented) storing of respective information or the respective date in a data structure/data set (which, e.g., in turn is also stored in a memory unit) in the context of the present disclosure.

The term "providing"—in particular in regard to data and/or information—can relate to a computer-implemented providing in connection with the present disclosure. Said providing may be implemented by an interface, e.g., a database interface, a network interface, an interface to a memory unit. It is possible that respective data and/or information are communicated and/or transmitted and/or retrieved and/or received when providing via the interface.

The term "providing" can also relate to a loading or saving, e.g., of a transaction together with respective data in the context of the present disclosure. For example, this can be implemented on or by a memory module.

The term "providing" can also relate to communicating (or transmitting or receiving or transfer) of respective data from a node to another node of the distributed database infrastructure (respectively of the corresponding infrastructure) in the context of the present disclosure.

A "smart contract" or a smart-contract process" or "smart-contract functionality" can refer to the execution of program code, e.g., of a control instruction, in a process via the distributed database or the respective infrastructure.

A "checksum", e.g., a data-block checksum, a data checksum, a node checksum, a transaction checksum, a chaining checksum or the like can relate to a cryptographic checksum or a cryptographic hash or hash value, in the context of the present disclosure. Such checksums can, in particular, be determined across a data set and/or data and/or one or more transactions and/or a subsection of a data block, e.g., the block header of a block of the blockchain or the data block header of a data block or only a part of the transaction of a data block. A checksum can be specifically implemented by a checksum or checksums or a hash value or hash values of a hash tree, e.g., a Merkle tree, a Patricia tree. Moreover, a "checksum" can also be implemented by a digital signature or a cryptographic message authentication code. By way of checksums, it is possible to implement cryptographic protection/protection against manipulation for transactions and the associated data and datasets on various levels of the distributed database. For example, if there is a need for an increased level of security, it would be possible to create and validate checksums on transaction level. For example, if a reduced level of security is required, then it would be possible to create and validate checksums on block level—e.g., across the entire block or only across a part of the data block and/or a part of the transaction.

A "data-block checksum" can relate to a checksum which is calculated across a part or all transactions of a data block in the context of the present disclosure. A node can validate/determine the integrity/authenticity of the respective part of the data block via data-block checksums. Alternatively or additionally, the data-block checksum can also be formed across transactions of a preceding data block/predecessor data block. The data-block checksum can, in particular, be implemented via a hash tree, e.g., a Merkle tree [1] or a Patricia tree. Here, the data-block checksum can be the root checksum of the Merkle tree of the Patricia tree or of another binary hash tree. It would be possible that transactions are saved by way of further checksums from the Merkle tree or the Patricia tree, respectively, e.g., by using the transaction checksums, wherein in particular the further checksums can relate to leaves of the Merkle tree or the Patricia tree, respectively. The data-block checksum can, thereby, protect the transaction by forming the root checksum from the further checksums. The data-block checksum can, in particular, be calculated for the transactions of a specific data block of the data blocks. In particular, such a data-block checksum can be included in a subsequent data block of the given data block, e.g., to chain this subsequent data block with the preceding data blocks and, in particular to make the integrity of the distributed database infrastructure testable. Thereby, the data-block checksum can implement the chaining checksum or, at least, go into the chaining checksum. The header of a data block (e.g., of a new data block or a data block for which the data-block checksum is determined) can include the data-block checksum.

A "transaction checksum" can relate to a checksum which is determined across a transaction of a data block, in connection with the present disclosure. In addition, the calculation of the data-block checksum of a respective data block can be accelerated, because for this already calculated transactions checksums can be readily used as leaves of a Merkle tree.

A "chaining checksum" in the context of the present disclosure can relate to a checksum which for the respective data block of a Blockchain indicates or references to a preceding data block of the Blockchain—which is often referred to as "previous block hash" in literature [1]. For this, in particular, a respective chaining checksum is determined for the preceding data block. The chaining checksum can be implemented, e.g., by a transaction checksum or a data-block checksum of a data block, i.e., of an existing data block of the Blockchain; to thereby chain a new data block with a (existing) data block of the Blockchain. For example, it would also be possible that a checksum is determined across a header of the preceding data block or across the entire preceding data block to be used as a chaining checksum. For example, this could also be calculated for multiple or all of the preceding data blocks. For example, the chaining checksum could also be implemented by a checksum determined across the header of a data block in the datablock checksum. A respective data block of the Blockchain includes, however, preferably a chaining checksum that has been calculated or relates to a preceding data block, specifically, the next-neighbor preceding data block directly adjacent to the respective data block. For example, it would also be possible that a respective chaining checksum is determined only across a part of the respective data block, e.g., the preceding data block. Thereby, a data block can be implemented which has an integrity protected part and a non-protected part. Thereby, a data block can be implemented that has a non-changeable integrity protected part and that has a non-protected part that can be modified later on. Integrity protected can mean that a change of the integrity protected data can be detected via a checksum.

Next, example embodiments of exmple implementations of a transaction are described.

The data—that is, e.g., stored in or written to a transaction of a data block—can be provided in various manners. Instead of data—e.g., user data such as measurement data or data/ownership structure regarding ASICs—a transaction of a data block can rather include the checksum for such data. The respective checksum can be implemented in various manners. For example, a respective data-block checksum of a data block, e.g., including the respective data, of another database or of the distributed database, a transaction checksum of a data block of the respective data, e.g., of the distributed database or of another database, or a data checksum determined across the data can be used.

In addition, the respective transaction can optionally include a link to or an indication of a memory position—e.g., an address of a file server and indications where the respective data are to be found on the file server, i.e., pertaining to off-chain storage; or an address of another distributed database which includes the data. The respective data could, e.g., also be provided in a further transaction of a further data block of the Blockchain—e.g., if the respective data and the associated checksums are included in different data blocks. It would also be possible that those data are provided via another communication channel—e.g., via another database and/or a cryptographically-secured communication channel.

In this regard, reading a dataset from a distributed database can generally correspond to reading either the entire dataset from the distributed database, or reading a checksum of the dataset from the distributed database and reading a payload data of the dataset from a non-distributed database.

Further, it would be possible that in addition to the checksum an add-on data set—e.g., a link or an indication to a memory position—is provided in the respective transaction. The add-on data set can, in particular, indicate where the data can be retrieved. This can be helpful to limit the amount of data of the blockchain.

The term "security protected" can, specifically, relate to a protection that can be implemented by a cryptographic method. For example, this can be implemented by using a distributed database infrastructure for the providing or communication or transmitting of respective data/transactions. This can be implemented by a combination of the various checksums—e.g., cryptographic—, by appropriate synergetic interaction between the checksums, to, e.g., increase the security or the cryptographic security for the data of the transactions. In other words, "security protected" in the context of the present disclosure can also relate to "cryptographically protected" and/or "protected against manipulation", wherein "protected against manipulation" can also be referred to as "protected integrity".

Insertion of transactions into a distributed database infrastructure can include chaining of data blocks of a Blockchain. The term "chaining of data blocks" in the connection of the present disclosure can relate to the data blocks respectively including information (such as the chaining checksum) which links to another data block or multiple other data blocks [1], [4], [5].

Insertion of transactions into a distributed database can include saving the transactions in one or more data blocks of the Blockchain.

Insertion of transactions can include validating and/or confirming transactions.

The term "insertion of transactions into the distributed database" or "writing of data to the distributed database" and the like can relate to communicating a transaction or transactions or a data block including the transactions to one or more nodes of a distributed database infrastructure. If those transactions are successfully validated, e.g., by way of the one or more nodes, these transactions can be chained as a new data block with at least one existing data block [1], [4], [5]. For this, the respective transactions are stored in a new data block. In particular, this validating and/or chaining can be implemented by a trusted node, e.g., a mining node, a blockchain oracle or a blockchain platform.

In particular, a blockchain can relate to a blockchain as a service, such as has been proposed by Microsoft or IBM. In particular, trusted nodes and/or other nodes can deposit a node checksum, e.g., a digital signature, in a data block, e.g., in a data block that has been validated by the respective node and which is then chained, in particular to facilitate identification of the creator of the data block and/or identification of the node. Here, the node checksum indicates which node has chained the respective data block with at least one other data block of the Blockchain.

A "transaction" or "transactions" in connection with the present disclosure can relate to a smart contract [4], [5], a data structure or a transaction data set, which, in particular, respectively include a transaction or multiple transactions. The term "transaction" or "transactions" can also relate to the data of a transaction of a data block of a blockchain, in connection with the present disclosure. A transaction can, e.g., include a program code which, e.g., implements a smart contract. For example, a transaction can also relate to a control transaction and/or a confirmation transaction in the context of the present disclosure. Alternative, a transaction can also be implemented by a data structure which saves the data (e.g., the control instructions and/or the contract data and/or other data such as video data, user data, measurement data etc.).

In particular, the term "saving or writing or storing transactions in data blocks", "saving transaction" and the like can relate to a direct saving or indirect saving. A direct saving can relate to the respective data block of the Blockchain or the respective transaction of the Blockchain including the respective data. An indirect saving can relate to the respective data block or the respective transaction including a checksum and, optionally, an add-on data set, e.g., a link to or an indication of a memory location for respective data; hence, the respective data are not directly saved in the data block (or the transaction). Rather, a checksum is provided for these data in the data block. In particular, these checksums can be validated when saving transactions in data blocks, such as has been explained above with respect to "inserting into the distribute database".

A "program code"—such as a smart contract—can relate to a program instruction or multiple program instructions which are saved in one or more transactions, in connection with the present disclosure. The program code can be executable and can be executed, e.g., by the distributed database. This can be implemented, e.g., by a runtime environment, e.g., of a virtual machine, wherein the runtime environment or the program code are preferably Turing complete. The program code is preferably executed by the infrastructure of the distributed database [4], [5]. Here, a virtual machine is implemented by the infrastructure of the distributed database. It is possible to execute the program code when validating a corresponding transaction.

A "smart contract" can relate to an executable program code in connection with the present disclosure [4], [5]—see, in particular, explanations with respect to "program code" provided above. The smart contract is preferably saved in a transaction of the distributed database—e.g., a blockchain—, e.g., in a data block. For example, the smart contract can be executed in the same manner as has been described in connection with the definition of "program code", in particular in connection with the subject disclosure.

The term "proof of work" can relate to solving a computationally expensive task, in particular, depending on the content of a data block or the content of a specific transaction, in connection with the present disclosure [1], [4], [5]. Such a computationally expensive task can also be referred to as cryptographic puzzle.

The term "distributed database", can generally relate to a decentralized, distributed database, a blockchain, a distributed ledger, a distributed memory system, a distributed ledger technology (DLT) based system (DLTS), a revision secure database system, a cloud, a cloud-service, a blockchain in a cloud or a peer-to-peer database system, in the context of the present disclosure. Also, various implementations of a blockchain or of a DLTS can be used, e.g., such as a blockchain or a DLTS that is implemented via a directed acyclic graph (DAG), a cryptographic puzzle, a hash graph or a combination of these variants [6], [7]. It would also be possible to implement different consensus algorithms. For example, a consensus algorithm can be implemented via a cryptographic puzzle, a gossip about gossip, a virtual voting or a combination of such techniques (e.g., gossip about gossip combined with virtual voting) [6], [7]. For example, if a blockchain is used, then this can, in particular, be implemented by a bitcoin-based implementation or an Ethereum-based implementation [1], [4], [5]. The term "distributed database" can also relate to a distributed database infrastructure that has at least a part of its nodes and/or devices and/or infrastructure implemented by a cloud. For example, the respective components can be implemented as nodes/devices in the cloud (e.g., as virtual nodes in a virtual machine). This can be implemented by WMware, Amazon web services or Microsoft Azure. Due to the increased flexibility of the described implementation scenarios, it is, in particular, possible to combine partial aspects of the described implementation scenarios with each other, e.g., by using a hash graph as blockchain, wherein the blockchain itself can also be a block batch.

For example, if a directed acyclic graph (DAG) is used (e.g., IOTA or Tangle), transactions or blocks or nodes of the graph are connected with each other via directed edges. I.e., (all) edges are (always) having the same direction, e.g., as observed for time. In other words it is, in particular, not possible to propagate through or visit transactions or blocks or nodes of the graph backwards (i.e., opposite to the common unified direction). Acyclic means, in particular, that there are no loops or ring closures when traversing the graph. For example, a distributed database infrastructure can relate to a public distributed database infrastructure (e.g., a public blockchain) or a closed (private) distributed database based system (e.g., a private blockchain).

For example, in the case of a public distributed database infrastructure, the nodes and/or devices can join the distributed database infrastructure without proof of authorization or authentication or login credentials, respectively be accepted by the distributed database infrastructure without such information. In particular, in such a case the operator of the nodes and/or devices can remain anonymous.

For example, in the case of implementation of the distributed database infrastructure by a closed database system, new nodes and/or devices can require a valid proof of authorization and/or valid authentication information and/or valid credentials and/or valid login information to join the distributed database infrastructure or be accepted by the distribute database infrastructure.

A distributed database infrastructure can also be implemented by a distributed communication system for data exchange. For example, this can be a network or a peer-to-peer network.

The term "data block"—that can be, depending on the context and implementation, also be referred to as "constituent" or "block"—can refer to, in the context of the present disclosure, a data block of a distributed database—e.g., a blockchain or a peer-to-peer database—, which are, in particular, implemented as a data structure and, preferably, include one of the transactions or multiple of the transactions. In an implementation, the database or the database system can be a DLT based system (DLTS) or a blockchain and the data block can be a block of the blockchain or of the DLTS.

As a general rule, a data block can, e.g., include indications of the size—e.g., data volume in bytes- of the data block, a data block header (block header), a transaction counter and one or more transactions [1]. The data block header can include a version, a chaining checksum, a data-block checksum, a timestamp, a proof of work, a Nonce—i.e., a unique value, a random value or a counter which is used for the proof of work [1], [4], [5]. A data block can, e.g., also simply relate to a respective memory range or address range of the overall data that is stored in the distributed database. Thereby, it is possible to implement blockless distributed database infrastructure such as the IOT chain (ITCA), IOTA, Byteball, etc. Here, the functionality of the blocks of a blockchain and of the transactions are combined with each other in such a manner that, e.g., the transactions themselves secure the sequence or chains of transactions of the distribute database, such that they are, in particular, saved in a secured manner. For this the transactions can be chained by way of a chaining checksum, e.g., by using a separate checksum or the transaction checksum of one or more transactions as chaining checksum, which is saved in a new transaction in the distributed database infrastructure when storing the new transaction in the distributed database. In such a scenario, a data block can, e.g., also include one or more transactions, wherein in a simple scenario a data block relates to a single transaction.

The term "Nonce" can relate to, in connection with the present disclosure, a cryptographic nonce—which is an abbreviation for "used only once" [2] or "number used once" [3]. In particular, a Nonce indicates individual numbers or a combination of letters that is preferably only used once in the respective context, e.g., transaction, data communication.

The term "preceding data blocks of a (given) data block of the Blockchain" can relate, in connection with the present disclosure, e.g., to the data block of the Blockchain that is a direct predecessor of the (given) data block. Alternatively, the term "preceding data blocks of a (given) data block of the distribute database" can also relate to all data blocks of the Blockchain that precede the given data block. Thereby, the chaining checksum or the transaction checksum can be determined across the direct preceding data block (respectively the transactions thereof) or all data blocks preceding the given data block (respectively the respective transactions).

The terms "blockchain node", "node", "node of an infrastructure of a distributed database", "mining node" and the like can relate, in the context of the present disclosure, to devices—e.g., mobile devices, wireless communication devices, computers, smartphones, clients or participants—that perform operations associated with the distributed database, e.g., a blockchain [1], [4], [5]. Such nodes can, e.g., execute transactions of a distributed database or the respective data blocks or can insert new data blocks including new transactions into the distributed database by way of new data blocks. In particular, this validation and/or chaining can be implemented by a trusted node, e.g., a mining node, or exclusively by trusted nodes. A trusted node is a node that has additional security measures—e.g., firewalls, access restrictions to the node or the like—to avoid manipulation of the node. Alternatively or additionally, a trusted node can, e.g., save a node checksum—e.g., a digital signature or a certificate—in the new data block when chaining the new data block. Thereby, it is possible to provide the proof that indicates that the respective data block has been inserted by a specific node, respectively indicate the originator.

As a general rule, device or the devices can be implemented by devices of a technical system and/or an industrial plant and/or an automation network and/or a fabrication plant, that can also be nodes of the infrastructure of the distribute database. Thereby, the devices can be mobile devices or devices of the Internet of things that can also be nodes of the infrastructure of the distributed database. Nodes can, e.g., include at least one processor, e.g., to execute their computer-implemented functionality.

The term "blockchain oracle" and the like can relate, in the context of the present disclosure, to nodes, devices or computers that include a security module that has software protection mechanisms—e.g., cryptographic methods—, mechanical protection mechanisms—e.g., a lockable housing—or electric protection measures—e.g., tamper protection or a protection system that deletes data of the security module in the case of unauthorized use/modification of the blockchain oracle. The security module can include, e.g., cryptographic keys that are required for the calculation of checksums—e.g., of transaction checksums or node checksums.

The term "computer" or "device" can relate to a computer (system), a client, a smartphone, a device or a server that are arranged outside of the blockchain, respectively or are not participants of the distributed database infrastructure, i.e., do not execute operations of the distributed database or simply retrieve those without executing transactions, inserting data blocks or calculate proof of works. Alternatively, the term "computer" or "device" can also relate to a node of the infrastructure of the distributed database. In other words, a device can in particular implement a node of the distributed database infrastructure or a device outside of the blockchain and the distributed database, respectively. A device outside of the distributed database infrastructure can, e.g., access the data—e.g., the transactions or the control transactions—of the distributed database. A device outside of the distributed database infrastructure can be controlled by nodes—e.g., by way of smart contracts and/or blockchain oracles. For example, if a control of a device—e.g., a device implemented as a node or a device outside of the distributed database infrastructure—is implemented by a node, then this can occur via a smart contract which, in particular, is saved in a transaction of the distributed database.

LIST OF CITATIONS

[1] Andreas M. Antonopoulos "Mastering Bitcoin: Unlocking Digital Cryptocurrencies", O'Reilly Media, December 2014, the entire contents of which are hereby incorporated herein by reference.

[2] Roger M. Needham, Michael D. Schroeder "Using encryption for authentication in large networks of computers" ACM: Communications of the ACM. Vol 21, Nr. 12 December 1978, the entire contents of which are hereby incorporated herein by reference.

[3] Ross Anderson "Security Engineering. A Guide to Building Dependable Distributed Systems" Wiley, 2001, the entire contents of which are hereby incorporated herein by reference.

[4] Henning Diedrich "Ethereum: Blockchains, Digital Assets, Smart Contracts, Decentralized Autonomous Organizations", CreateSpace Independent Publishing Platform, 2016, the entire contents of which are hereby incorporated herein by reference.

[5] "The Ethereum Book Project/Mastering Ethereum" https://github.com/ethereumbook/ethereumbook, Oct. 5, 2017, the entire contents of which are hereby incorporated herein by reference.

[6] Leemon Baird "The Swirlds Hashgraph Consensus Algorithm: Fair, Fast, Byzantine Fault Tolerance", the entire contents of which are hereby incorporated herein by reference.

Swirlds Tech Report SWIRLDS-TR-2016-01, May 31, 2016, the entire contents of which are hereby incorporated herein by reference.

[7] Leemon Baird "Overview of Swirlds Hashgraph", May 31, 2016, the entire contents of which are hereby incorporated herein by reference.

[8] Blockchain Oracles, https://blockchainhub.net/blockchain-oracles/ (retrieved Jul. 12, 2018), the entire contents of which are hereby incorporated herein by reference.

It is to be understood that the features mentioned above and those yet to be explained below may be used not only in the respective combinations indicated, but also in other combinations or in isolation without departing from the scope of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of storing and analyzing data are described. The techniques described herein can be applied for various kinds and type of data. Various techniques will be described in connection with storing and analyzing measurement datasets. Measurement datasets can be indicative of one or more observables of an event. For example, the event may be a software event or a physical event. For example, to obtain a measurement dataset that is indicative of one or more observables of a software event, a so-called software oracle could be used. The software oracle could track or monitor your content of a webpage, traffic on a communication line, the status of report messages issued by an IOT device, etc. For example, the event may be a physical event. To obtain a measurement dataset that is indicative of one or more observables of a physical event, a hardware oracle or sensor device could be used. The sensor device could measure, e.g., one or more of the following physical observables: light, pressure, temperature, current, voltage, humidity, etc.

The event can be associated with an industrial field device. Here, different kinds and types of industrial field devices can benefit from the techniques described herein: As a general rule, the techniques described herein can find application in various fields such as monitoring characteristics of electrical grids and microgrids, the industrial field devices pertaining to nodes of the grids or microgrids; monitoring characteristics of industrial field devices such as turbines, subsea equipment, medical equipment such as magnetic-resonance imaging or computer tomography; monitoring characteristics of vehicles such as trains or ships or airplanes; etc.

As a general rule, a measurement dataset can include raw measurement data and/or processed measurement data. Raw measurement data can correspond to the output of the oracle or of the sensor device; while processed measurement data can correspond to the raw measurement data after some processing in accordance with a processing algorithm. There can be a tendency that processed measurement data is smaller if compared to the raw measurement data. To give an example: it would be possible that a 2-D stereo camera outputs to 2D images having pixels, each pixel having a certain color or brightness value. Then, this raw measurement data can be processed to, e.g., identify objects in the 2-D images using object recognition. The objects could be identified with a bounding box or position label and a category label indicative of the type of the object, e.g., vehicle, person, tree, etc. The processed measurement data could also include distances for the object obtained from a comparison of multiple 2-D images at a given frame. In such a scenario, the processed measurement data may be significantly smaller if compared to the raw measurement data. For example, a list of objects with associated categories and distances may be significantly smaller if compared to the set of pixels (e.g., a few megapixels), each pixel having an n-bit value indicating its brightness, etc. While the examples above have been described in connection with an implementation using a 2-D stereo camera as the source of the measurement dataset, the techniques described herein are not limited to such an example. Various other kinds and types of sources of the measurement dataset are conceivable.

More specifically, the measurement datasets as described herein can be indicative of operational characteristics of an industrial field device. I.e., the event for which observables are included in the measurement dataset can be associated with the operation of an industrial field device. Here, the type of the operational characteristics can depend on the type of industrial field device. Operational characteristics can generally describe the operation of the industrial field device. For example, where the industrial field device is used to produce goods, the operational characteristics could be associated with a production rate of the goods. The operational characteristics can generally correspond to an output of the industrial field device. The operational characteristics could correspond to a physical behavior of the industrial field device, e.g., it's position, motion pattern, etc. The operational characteristics could pertain to an input to the industrial field device, e.g., inflow of raw material or power consumption, etc.

Various techniques are based on the finding that often the interpretation of the information content of the measurement dataset can depend on a current setting of one or more operational policies of a control of the industrial field device. In further detail, the control can include or operate in accordance with operational parameters. These parameters can define the output of control and, as such, the operation of the industrial field device. The setting of the one or more operational policies can correspond to a choice of certain values for the parameters of the control. Hence, sometimes, the setting of the one or more operational policies of the control is simply referred to as device parameterization of the industrial field device.

The device parameterization can change over the course of time. I.e., the setting of the one or more operational policy states may be subject to changes. For example, it would be possible that such changes are triggered via a Human-Machine-Interface (HMI) by a user. Sometimes, the setting of the one or more operational policy states may also be subject to changes in accordance with a predefined timing schedule. For example, corresponding timing control data may be stored in a memory to which the control of the industrial field device has access.

In view of this finding, in reference implementations the interpretation of the measurement datasets stored in the distributed database can sometimes be difficult. To give an example, the interpretation of the measurement dataset stored in the distributed database can sometimes depend on the context of the operation of the industrial field device with respect to which the underlying raw measurement data has been obtained. Therefore, one possible attack vector for manipulation of the measurement dataset can also lie in manipulation of the context of the operation of the industrial field device: then, depending on the context of the industrial field device, one and the same measurement dataset can sometimes convey different information. In other words: where a reference is required to interpret a measurement dataset, the information conveyed by the measurement dataset can be manipulated either by manipulating the measurement dataset itself, or by manipulating the reference used to interpret the measurement dataset to obtain the information.

Various techniques mitigate this problem by storing the device parametrization in the distributed database; and using the device parametrization when analyzing the respective measurement dataset(s). In particular, the device parameterization defines the context of the operation of the field device. Thus, it defines the context with respect to which the measurement dataset is to be interpreted.

In further detail, depending on the setting of the one or more operational policy states, the industrial field device may behave differently. I.e., the operation of the industrial field device may depend on the setting of the one or more operational policy states. Thus, an event associated with the industrial field device and indicated by a measurement dataset can be influenced by the setting of the one or more operational policy states. For example, the setting of the one or more operational policy states could define a physical-technical context of one or more observables of the event.

This finding is explained using the following practical example: for example, it would be possible that the setting of a respective operational policy state defines a warning threshold. For example, the warning threshold may define a pressure. If the pressure in a pump chamber of a pump rises above the pressure threshold, a warning may be issued. The warning could be included in a measurement dataset, as information pertaining to the event "overpressure". Then, the interpretation of the measurement dataset, here specifically of the warning message, may depend on the underlying pressure threshold. For example, if the pressure threshold is set to a comparably low value, then the warning may have less severe impacts on the remaining operation of the industrial system relying on the operation of the pump as if compared to a scenario in which the pressure threshold is set to a comparably high pressure, e.g., closer to ambient pressure.

According to various examples, it is possible to write a configuration dataset that is indicative of the setting of the one or more operational policies of the control of the industrial field device to a distributed database. Such techniques facilitate reliable interpretation and analysis of the operation of the industrial field device.

In particular, according to various examples, it would be possible that also an associated measurement dataset that is indicative of the event associated with the industrial field device is written to the distributed database. Further, it would be possible that a cross-reference between the configuration dataset in the measurement dataset is written to the distributed database.

Such techniques facilitate a subsequent analysis of the measurement dataset to be performed depending on the configuration dataset. For example, for this purpose, both the configuration dataset, as well as the measurement dataset can be read from the distributed database.

As a general rule, various types of analysis of measurement datasets can benefit from taking into account the configuration dataset. To give just of a few examples: it would be possible that the analysis includes at least one of an integrity check of the measurement dataset, or an aging or maintenance prediction of the field device, or a performance-based charging of operation of the field device.

For example, the integrity check can correspond to identifying whether the measurement dataset has been manipulated in an unauthorized manner. For example, certain inconsistencies between the setting of the one or more operational policies indicated by the configuration dataset and the event associated with the industrial field devices indicated by the measurement dataset could lead to the conclusion that the measurement dataset has been manipulated. For example, if the measurement dataset indicates an event that is precluded from happening due to the respective setting of the one or more operational policies of the control of the industrial field device, then this can be indicative of a fraud or manipulation.

Aging or maintenance prediction can pertain to determining an aging state or need for maintenance action for the industrial field device. For example, the load imposed on the industrial field device can depend on the setting of the one or more operational policies of the control. For example, the wear-out of the industrial field device can depend on the technical-physical context of one or more observables of the event. To give an example, it would be possible that the setting of the one or more operational policies defines whether an oil flow through a turbine is high or low. In such a scenario, the same round-per-minute measurement (i.e., the same event) of the turbine can lead to a high or low wear-out. Thus, the aging or maintenance of the industrial field device may be dependent on the respective setting of the one or more operational policies.

Further, the performance-based charging of operation of the field device can correspond to pay-per-use scenarios. Here, the reference value used as the underlying reference to determine the amount to be charged can vary depending on the setting of the one or more operational policies. To give an example, even though the measurement dataset indicates one and the same event for different scenarios, certain functionality of the control may be deactivated or activated depending on the setting of the one or more operational policies. Then, the charging can be adjusted accordingly if the analysis of the measurement dataset also depends on the configuration dataset.

Various techniques employ a distributed database for storing data associated with industrial field devices. In particular, various techniques employ a Blockchain for implementing the distributed database. While various techniques will be described in connection with a scenario in which the distributed database is implemented by a Blockchain, similar techniques may be applied for other kinds and types of distributed databases, e.g., blockless databases, a DLTS, etc.

FIG. 1 schematically illustrates a system 100.

The system 100 includes a control node 101. The control node 101 includes a processor 105 and a memory 106, forming a control circuitry. The control node 101 also includes a communication interface 107 that is connected to a communication network 171, e.g., the Internet. The processor 105 can implement a control of an industrial field device 199, e.g., in software and/or in hardware. This control is dependent on a setting of one or more operational policies.

As will be appreciated from the above, the control node 101 can implement control functionality. The control node 101 can also implement oracle functionality. In other examples, different nodes may implement the control functionality and the oracle functionality (e.g., a control node and a measurement node).

For example, the control node 101 could implement a hardware oracle and/or a software oracle (in some examples, the control functionality and the measurement/oracle functionality may be implemented by different nodes). For example, the control node 101 could include or be otherwise coupled to a sensor device. The sensor device could obtain raw measurement data or data samples indicative of one or more physical observables of an event associated with the industrial field device 199 (as schematically illustrated in FIG. 1).

The control node 101 also includes an HMI 108. Via the HMI 108, a user 198 can interact with the processor 105. For example, the user 198 could change the setting of the operational policies of the control.

The system 100 also includes a Blockchain infrastructure 150. The Blockchain infrastructure 150 includes multiple mining nodes, wherein FIG. 1, for sake of simplicity, only a single mining node 151 is illustrated. Any further mining nodes can be configured in accordance with the configuration of the mining node 151 illustrated in FIG. 1. The mining node 151 includes a processor 155 and a memory 156. The processor 155 and the memory 156 implement a control circuitry. The mining node 151 also includes a communication interface 157 via which the processor 155 can communicate with the communication network 171, e.g., to exchange data with the control node 101 or a third-party node 111.

The system 100 also includes the third-party node 111. The node 111 includes a processor 115 and a memory 116. The processor 115 and the memory 116 implement a control circuitry. The node 111 also includes a communication interface 117. The processor 115 can communicate with the communication network 171 via the communication interface 117.

While in the example embodiment of FIG. 1 the system 100 only includes a single third-party node 111, and various examples it would be possible that the system 100 includes multiple third-party nodes, e.g., an operator node and a client node (not illustrated in FIG. 7). Different stakeholders in a process may operate different third-party nodes.

As illustrated in FIG. 1, a Blockchain 159 is implemented in the Blockchain infrastructure 150. The system 100 also includes a non-distributed database 172. It is possible to implement on-chain storage using the Blockchain 159. It is possible to implement off-chain storage using the non-distributed database 172.

As a general rule, the non-distributed database 172 may operate without multiple replicates across different site. I.e., a centralized copy of the non-distributed database may be used for operational access. The non-distributed database 172 may not be implemented as a distributed ledger or Blockchain. The non-distributed database 172, thus, is different from the Blockchain 159.

Various examples described herein pertain to storing a measurement dataset. More specifically, various scenarios pertain to writing the measurement dataset to the blockchain 159. Various scenarios also pertain to storing a configuration dataset that is associated with the measurement dataset. Various scenarios pertain to writing the configuration dataset to the blockchain 159. Details with respect to the measurement dataset and the configuration dataset are illustrated in connection with FIG. 2.

Figure 2:
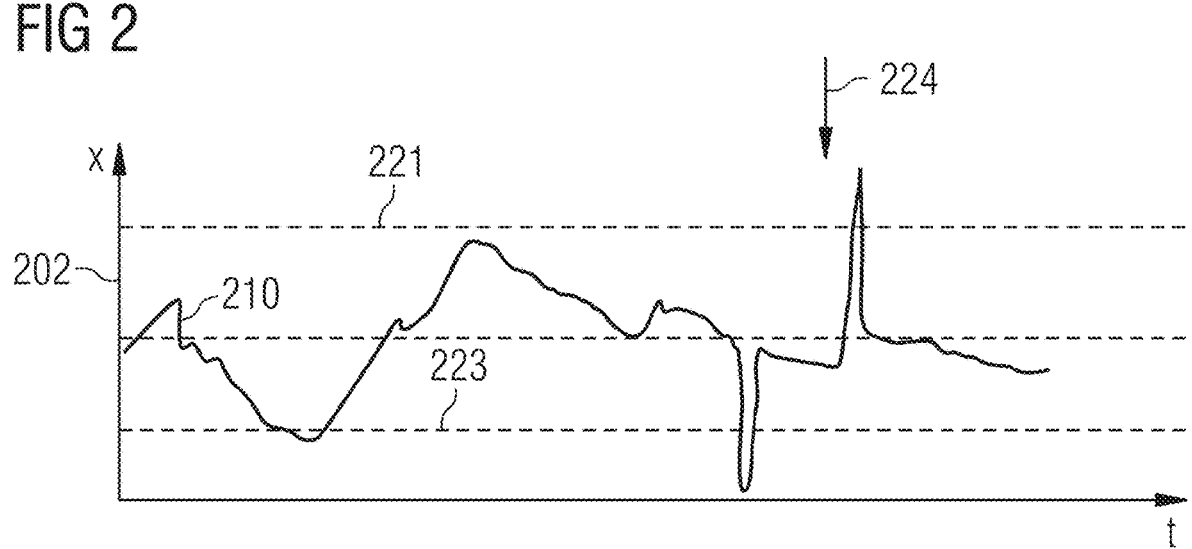
FIG. 2 schematically illustrates a measurement dataset and a configuration dataset according to various examples.

FIG. 2 schematically illustrates aspects associated with a measurement dataset 210. In the scenario FIG. 2, the measurement dataset 210 includes a time-series of raw data samples of a physical observable 202 as a function of time 201. The physical observable 202 monitors one or more operational characteristics of the industrial field device 199. For instance, the physical observable 202 could be indicative of a pressure in a vacuum chamber of the industrial field device 199.

FIG. 2 also illustrates aspects with respect to a configuration dataset that is indicative of a setting 221, 223 of one or more operational policies of the control of the industrial field device 199 (e.g., implemented by the processor 105 of the control node 101, cf. FIG. 1). In the example of FIG. 2, the setting pertains to an upper set point and a lower set point for a closed-loop control logic implemented by the control of the industrial field device 199. The operation of a pump of the industrial field device 199 is dependent on these set points 221, 223. For example, if the pressure indicated by the measurement dataset 210 approaches the upper threshold 221, the operation of the pump can be increased, e.g., by increasing the rounds per minute; thus counter-acting the pressure rise.

Thus, the fluctuation of the pressure indicated by the measurement dataset 210 correlates with the set points 221, 223. An event 224 occurs where the observable, here the pressure associated with the physical observable 202, crosses the set points 221, 223. For example, the event 224 could be indicative of a clogging of a vacuum pipe leading towards or away from the vacuum chamber, or indicative of contaminants entering the vacuum chamber.

As will be appreciated from the above, the setting 221, 223 of the one or more operational policy states defines the physical-technical contact of the observable 202 (in the example of FIG. 2, the pressure) associated with the event 224. This is explained for the following example: considering another setting 221, 223, e.g., a more relaxed setting of the set points, the same spikes in the observable 202 may not be judged to be abnormal.

Figure 3:
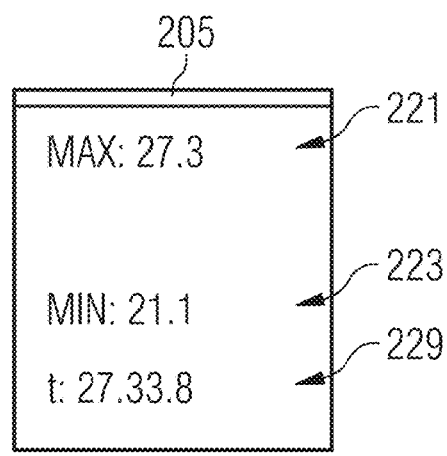
FIG. 3 schematically illustrates the configuration dataset in further detail.

FIG. 3 schematically illustrates the configuration dataset 205. As illustrated in FIG. 3, the configuration dataset 205 is indicative of the settings 221, 223 of the operational policies of the control of the industrial field device 199.

In the example of FIG. 3, the configuration dataset 205 also includes a timestamp 229. For example, the timestamp 229 may define a temporal validity of the configuration dataset 205. This can be helpful in cases where there are changes to the settings 221, 223.

Figure 4:
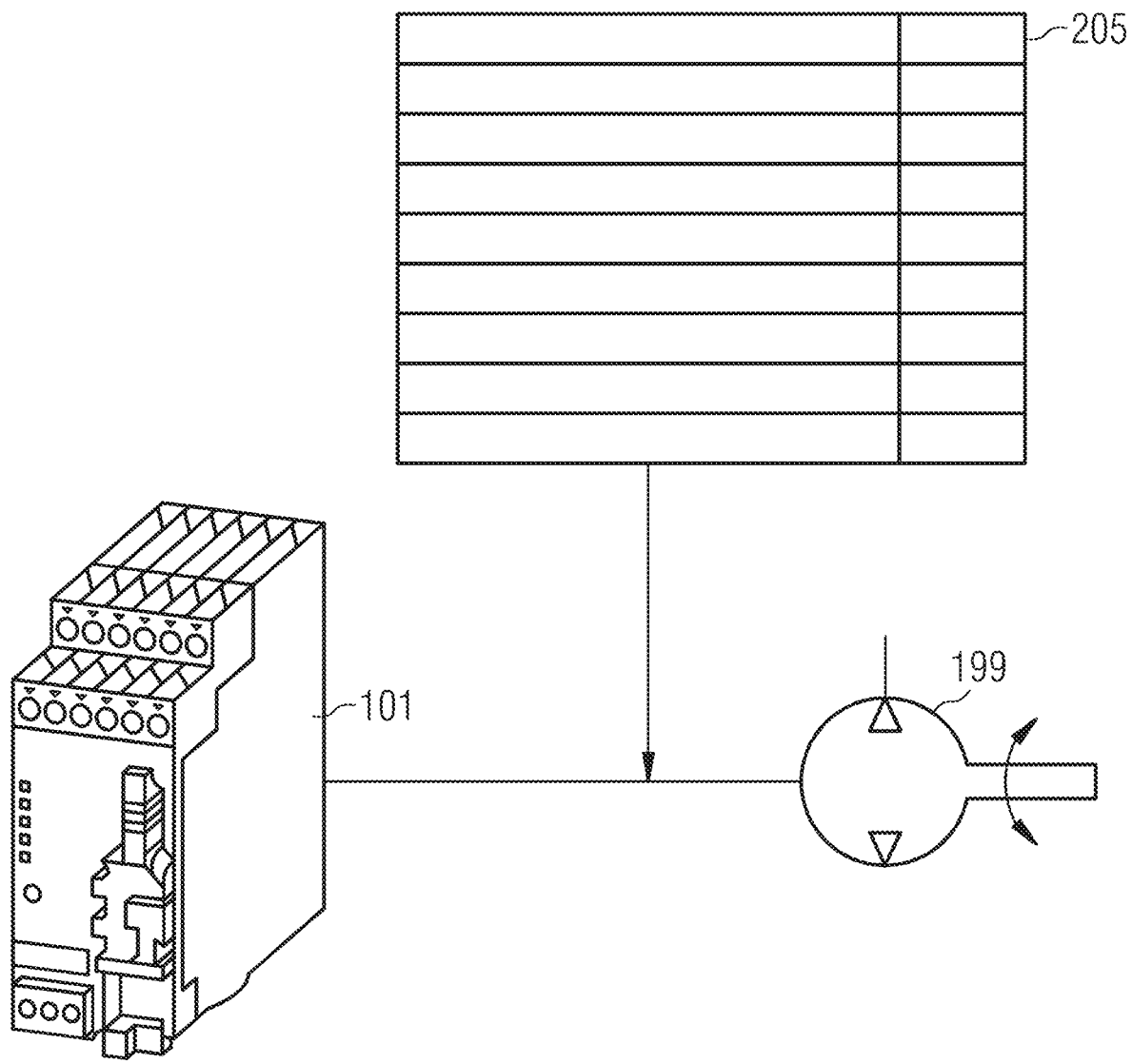
FIG. 4 schematically illustrates the configuration dataset in further detail.

FIG. 4 schematically illustrates aspects with respect to the configuration dataset 205. In the example of FIG. 4, the configuration dataset 205 includes a number of upper and lower thresholds, both for the operation of a pump implementing the industrial field device 199, as well as for triggering a warning, e.g., via the human machine interface 108 and/or to be included in the measurement dataset 210.

In the example of FIG. 4, the configuration data set 205 includes the following parameter/value pairs as illustrated in table 1:

| Parameter | Value |
| --- | --- |
| Current Upper Limit Warn | 80% |
| Current Upper Limit Trip | 100% |
| Current Upper Limit Response | trip |
| Current Upper Limit Hysteresis | 5% |
| Current Lower Limit Warn | 30% |
| Current Lower Limit Trip | 20% |
| Current Lower Limit Response | delay |
| Current Lower Limit Hysteresis | 5% |

While above various examples regarding implementations of the configuration dataset 205 and the associated one or more operational policies have been described, variations and other scenarios of implementing the configuration data and the one or more operational policies are possible in further scenarios. In particular, as will be appreciated, the particular implementation of the one or more operational policies can be dependent on the particular implementation of the industrial field device. Typically, the control of different types of field devices will be different to each other. Accordingly, also the associated operational policies will vary. As a general rule, the one or more operational policies can include one or more of the following: an active mode of operation of the industrial field device that is selected from a plurality of candidate modes of operation; and/or operational threshold constraints of the operation of the industrial field device (cf. set points of FIG. 2); and/or human machine interaction of the industrial field device; and/or human machine interaction warning settings of the industrial field device.

Figure 5:
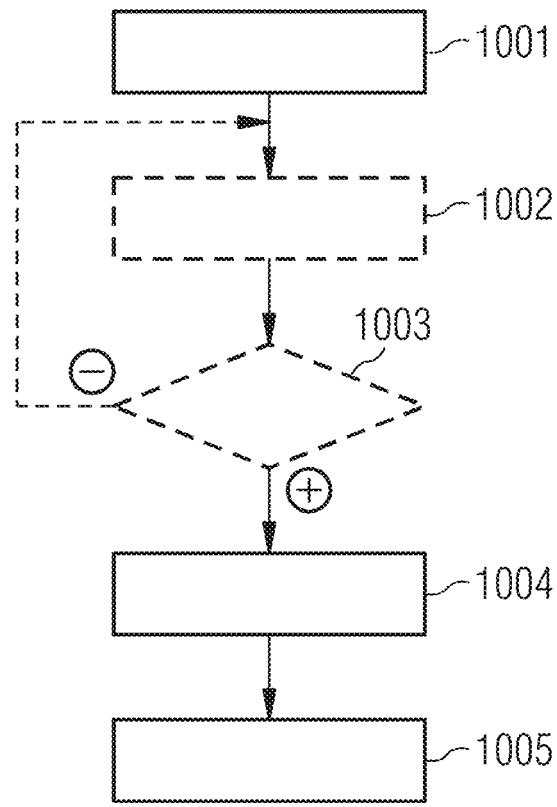
FIG. 5 is a flowchart of a method according to various examples.

FIG. 5 is a flowchart of a method according to various examples. For example, the method of FIG. 5 could be executed by the control node 101, e.g., by the processor 105 upon loading respective program code from the memory 106. It would also be possible that the method according to FIG. 5 is executed by the mining node 151 of the blockchain infrastructure 150, e.g., by the processor 155 upon loading program code from the memory 156. For sake of simplicity, various examples are described in connection with an example implementation of the method of FIG. 5 in which the mining node 151 executes the method, but similar techniques may be readily applied to other scenarios.

At box 1001, a measurement dataset is obtained, e.g., the measurement dataset 210 (cf. FIG. 2). For example, box 1001 may include receiving the measurement dataset from a sensor device or a node providing oracle functionality. For example, box 1001 can include pre-processing raw data samples to obtain the measurement dataset 210.

The measurement dataset is indicative of one or more events associated with an industrial field device, e.g., associated with the operation of the industrial field device 199 (cf. FIG. 1).

At optional box 1002, it is monitored whether a setting of one or more operational policies of a control of the industrial field device changes. This can include tracing or tracking the development of the setting over the course of time. Generally, the setting is monitored for changes. Accordingly, at box 1003, it is checked whether changes have occurred, based on the tracking at box 1002. If a change has occurred, then the method commences with box 1004. At box 1004, a configuration dataset is obtained, e.g., the configuration dataset 205 (cf. FIG. 3). The configuration dataset is indicative of the setting of the one or more operational policies of the control of the industrial field device.

As will be appreciated, in the example of FIG. 5, if the optional boxes 1002 and 1003 are executed, the obtaining of the configuration dataset is triggered based on monitoring in box 1002. This has the advantage that any changes to the setting are tracked and stored in the distributed database, as will be explained next.

In particular, in box 1005, the configuration dataset is written to the distributed database. Optionally, the measurement dataset is written to the distributed database. Further optionally, it would be possible that a cross-reference between the configuration dataset 205 and the measurement dataset 210 is written to the distributed database.

The cross-reference facilitates reading/loading, from the distributed database, the configuration dataset along with the measurement dataset, or vice versa. As a general rule, various options are available for implementing the cross-reference. For example, a pointer to a memory position of, both, the measurement dataset and the configuration dataset could be used. For example, a pointer to the memory position of the measurement dataset in the distributed database could be included at the memory position of the configuration dataset, or vice versa. For example, the cross-reference could be implemented as a link. For example, the cross-reference could be implemented as a checksum, e.g., a hash value. For example, a cross-reference to the measurement dataset could be implemented by a checksum of the measurement dataset and the cross-reference to the configuration dataset could be implemented by a checksum of the configuration dataset. Transaction checksums can be used.

As a general rule, in various examples it would be possible that the cross-reference includes one or more timestamps associated with a time variability of at least one of the measurement dataset or the configuration dataset. In particular, the time-variability of the measurement dataset and/or of the configuration dataset can pertain to changes in the measurement dataset and/or the configuration dataset. To track these changes, the timestamp in the cross-reference can be helpful, e.g., to identify the particular configuration dataset that is applicable to a given measurement dataset, or vice versa. This helps to resolve ambiguities where changes to the configuration dataset and/or the measurement dataset are observed.

As a general rule, various options are available for implementing box 1005, i.e., for writing various data to the distributed database. In one example, the entire measurement dataset and the entire configuration dataset could be included as payload data in a transaction in a block of a blockchain implementing the distributed database. Such a scenario corresponds to on-chain storage of the payload data. In other examples, it would be possible that the payload data is at least partially stored off-chain. In such a scenario, it would be possible to determine a checksum for the measurement dataset and store the measurement dataset off-chain, while storing the checksum on-chain. Similar techniques can also be implemented for the configuration dataset. Thus, generally speaking, it would be possible that a payload data of the configuration dataset is stored in a non-distributed database, e.g., the database 172 (cf. FIG. 1). A checksum of the payload data of the configuration dataset can be stored in the distributed database, e.g., the blockchain 159 (cf. FIG. 1). Such techniques facilitate reducing computational resources required in connection with operating the blockchain infrastructure 150. In particular, certain size limitations can be met by keeping the payload data in the non-distributed database 172. Also, the checksum may be invariant with respect to the size of the payload data. This can facilitate a simple structure of the Blockchain 159.

In some examples, it can be desirable to digitally sign at least a part of the configuration dataset using a cryptographic digital signature. The cryptographic signature can be generally associated with a public-private keying material. Here, the signature can be determined based on a private key of the public-private keying material; and the signature can be checked based on a public key of the public-private keying material. According to certain examples, it would be possible that the cryptographic signature is determined for the payload data of the configuration dataset.

For example, it would be possible that the cryptographic signature is determined close to or at the respective node implementing the control functionality (cf. FIG. 1, control node 101).

According to various examples, it is possible that the cryptographic digital signature is stored on-chain. In particular, it would be possible that the cryptographic digital signature is included in the blockchain 159 (cf. FIG. 1). This increases the possibility of detecting manipulation of the configuration dataset.

Figure 6:
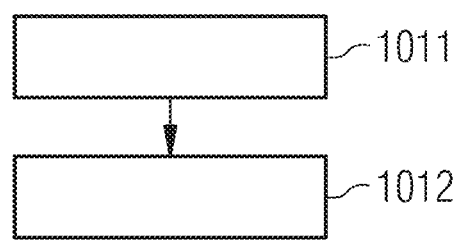
FIG. 6 is a flowchart of a method according to various examples.

FIG. 6 is a flowchart of a method according to various examples. For example, the method of FIG. 6 could be implemented by a mining node of an infrastructure of a distributed database. For example, the method of FIG. 6 could be implemented by the mining node 151 (cf. FIG. 1), e.g., by the processor 155 upon loading program code from the memory 156. It would also be possible that the method of FIG. 6 is implemented by a third-party node of a stakeholder in the measurement datasets. For example, it would be possible that the method of FIG. 6 is implemented by the node 111 (cf. FIG. 1), e.g., by the processor 115 upon loading program code from the memory 116.

At box 1011 data is read from a distributed database, e.g., from the blockchain 159, and, optionally, from a non-distributed database, e.g., the non-distributed database 172 (cf. FIG. 1).

In particular, data can be read, both, from a distributed database and a non-distributed database in case of a mixed on-chain/off-chain scenario. In such a scenario the payload data is stored in the non-distributed database, and the checksum is stored in the distributed database. In such a scenario, box 1011 can also include verifying the payload data based on the checksum that is stored in the distributed database.

At box 1011, a cross-reference between a configuration dataset that is indicative of a setting of one or more operational policies of a control of an industrial field device, in the measurement dataset that is indicative of an event associated with the industrial field device is read.

Further, the configuration dataset in the measurement dataset is read. As such, box 1011 is interrelated to box 1005 (cf. FIG. 5).

At box 1011, the cross-reference can be used to identify appropriate pairs of configuration and measurement datasets.

Next, at box 1012 an analysis of the measurement dataset is performed. This analysis depends on the configuration dataset.

As a general rule, the analysis can be with respect to one or more objectives. For example, it would be possible that the analysis includes at least one of an integrity check of the measurement dataset, or an aging or maintenance prediction of the industrial field device, or a performance-based charging of operation of the field device.

The analysis can be implemented in accordance with a predefined algorithm. For example, the algorithm could implement a comparison between (i) one or more of observables associated with the event, e.g., the observable 202, cf. FIG. 2, and (ii) a physical-technical context defined by the setting of one or more operational policies as indicated by the configuration data. With reference to FIG. 2: e.g., it could be checked whether the observable 202 exceeds the set points 221, 223: the set points 221, 223 define the physical-technical context with respect to which the observable 202, e.g., pressure needs to be interpreted.

FIG. 7 is a signaling diagram illustrating techniques of storing a configuration dataset 205 according to various examples. The example of FIG. 7 is implemented using the system 100 (cf. FIG. 1), but could generally be implemented using other system architectures or systems.

At 3001, a user 198 configures the configuration dataset 205 via the HMI 108 of the control node 101. This results in a change of the configuration dataset 205 used by the control node 101 to control the operation of the industrial field device 199. As a general rule, changes to the configuration dataset 205 may not only be triggered by user interaction, but alternatively or additionally also automatically or depending on automated external trigger criteria.

Next, at 3002, the payload of the configuration dataset 205 is stored in the non-distributed database 172; and at 3003, a confirmation signal 401 is transmitted to the control node 101.

The control node 101 also determines a checksum 206 of the configuration dataset 205. For example, the checksum 206 could be implemented by a hash value. Then, the checksum 206, at 3004, is written to the blockchain 159. This can include transmitting a corresponding transaction to one or more mining nodes 151 of the blockchain infrastructure 150 (not illustrated in FIG. 7 for sake of simplicity). A respective confirmation signal 402 is received at the control node 101 at 3005.

While in the scenario of FIG. 7 the control node 101 accesses the non-distributed database 172 and determines the checksum 206, in other examples, these tasks could be implemented by a mining node 151 of the blockchain infrastructure 150, e.g., using a respective smart contract.

As a general rule, it would be possible that the checksum 206 is digitally signed with a cryptographic signature. I.e., a public-private keying material could be used to determine a signature of the checksum 206. The cryptographic digital signature could be stored in the blockchain 159 along with the checksum 206. It would also be possible to store a timestamp—e.g., associated with the creation of the checksum 206 or with the validity of the configuration dataset 205—in the blockchain 159.

As will be appreciated, 3002-3005 implement box 1005 (cf. FIG. 5).

Next, details with respect to verifying the configuration dataset 205 are explained. At 3011, a request 411 is transmitted by the node 111 to the blockchain 159, e.g., to a mining node 151 of the blockchain infrastructure 150. This request 411 returns the checksum 206 of the configuration dataset 205 at 3012 (and, optionally, the timestamp and the digital signature). Then, the checksum 206 is used, at 3013, to query the non-distributed database 172 and, at 3014, read the payload data of the configuration dataset 205.

At 3015, it is then possible to ex-post detect modifications of the configuration dataset 205 stored in the non-distributed database 172 by verifying/recalculating the checksum and comparing the latter against the checksum 206 received at 3012. A verification of the checksum itself can be implemented by checking the digital signature. For this, a query 413 can be transmitted to the user 198, the query 413 returning, at 3017, the public key of 414 of the public-private keying material. At 3018, the digital signature can be checked.

FIG. 8 illustrates the information content of the various datasets 205-206 of the signaling diagram of FIG. 7 in further detail. FIG. 8 also illustrates the cross-reference 299 between the non-distributed database 172 and the distributed database 159 being implemented based on the checksum.

For example, in FIG. 8, the data set 206 could include the following information, as illustrated by table 2:

| Parameter | Value |
| --- | --- |
| Current Upper Limit Warn | 85% |
| Current Upper Limit Trip | 100% |
| Current Upper Limit Response | trip |
| Current Upper Limit Hysteresis | 5% |
| Current Lower Limit Warn | 30% |
| Current Lower Limit Trip | 15% |
| Current Lower Limit Response | delay |
| Current Lower Limit Hysteresis | 5% |

Summarizing, above, techniques have been described which facilitate analysis of a measurement dataset under consideration of relevant parameterization of an associated control. A respective configuration dataset that is indicative of a setting of one or more operational policies can be securely stored using a distributed database such as a blockchain.

To this end, techniques have been described in which a checksum of the configuration dataset is stored in the distributed database. The checksum can serve as a cross-reference to payload data of the configuration dataset stored in a non-distributed database. For example, the checksum can be implemented as a hash value. The length of the hash value can be independent of the length of the payload data based on which the hash value is determined. Thereby, the structure of the distributed database does not show a dependency on type and size of the configuration dataset.

The payload data of the configuration dataset can be stored in the non-distributed database to which various parties may have access. The cross-reference to the distributed data set can be implemented via the checksum. For example, the checksum can be implemented by a hash value. The hash value can also be digitally signed. A digital signature can be determined for the checksum. The digital signature can also be stored in the distributed database. Using public-private keying material any interested stakeholder can check the validity of the checksum stored in the distributed database, by checking the signature based on the public key of the owner.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, various techniques have been described with reference to a system that includes a node implementing, both, control functionality for an industrial field device, as well as measurement/oracle functionality. However, according to various examples, it would be possible that different nodes implement the control functionality and the measurement/Oracle functionality, respectively.

For further illustration, various examples have been described in which measurement data is stored cross-referenced to configuration data. However, generally, the storing of the measurement data is optional.

For still further illustration, various examples have been described in which configuration data is written to a distributed database by storing a checksum of the payload of the configuration data on-chain and storing the payload of the configuration data off-chain. This implementation is generally optional and it would be possible that the entire configuration data, including the payload, is stored on-chain, i.e., in the distributed database.

For further illustration, various techniques have been described in which a blockchain is used as a distributed database. Generally, it would be possible to implement different kinds and types of distributed databases, e.g., distributed letters, etc.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A node, comprising:
   control circuitry configured to
      monitor a setting of one or more operational policies of a control of an industrial field device, and
      upon detecting that a change to the setting has occurred
         obtain a configuration dataset indicative of the setting of the one or more operational policies of the control of the industrial field device,
         write payload data of the configuration dataset to a non-distributed database,
         determine a checksum of the configuration dataset, and
         write the checksum to a distributed database, wherein the distributed database is a blockchain database.

2. The node of claim 1,
   wherein the one or more operational policies include one or more of:
      an active mode of operation of the industrial field device selected from a plurality of candidate modes of operation;
      operational threshold constraints of the operation of the industrial field device;
      a human-machine-interaction of the industrial field device; or
      human-machine-interaction warning settings of the industrial field device.

3. The node of claim 1,
   wherein the checksum of the configuration dataset is invariant with respect to a size of the payload data of the configuration dataset.

4. The node of claim 1,
   wherein a cryptographic signature of at least a part of the configuration dataset is stored in the distributed database, the cryptographic signature being associated with a public-private keying material.

5. The node of claim 1, wherein the checksum of the configuration dataset is a hash value.

6. A method, comprising:
   monitoring a setting of one or more operational policies of a control of an industrial field device; and
   upon detecting that a change to the setting has occurred
      obtaining a configuration dataset indicative of the setting of the one or more operational policies of the control of the industrial field device,
      writing payload data of the configuration dataset to a non-distributed database,
      determining a checksum of the configuration dataset, and
      writing the checksum to a distributed database, wherein the distributed database is a blockchain database.

7. The method of claim 6, wherein the method is executed by a node including control circuitry to implement the method.

8. A non-transitory computer readable storage medium storing program code that is loadable and executable by a processor, wherein when executed by the processor, the program code configures the processor to execute the method of claim 6.

* * * * *